April 21, 1959 L. R. WILSON 2,883,189

CARD PROCESSING APPARATUS

Filed July 30, 1956 2 Sheets-Sheet 1

INVENTOR:
Loren R. Wilson

By Smyth & Roston
Attorneys

INVENTOR:
Loren R. Wilson
By Smyth & Roston
Attorneys.

2,883,189

CARD PROCESSING APPARATUS

Loren R. Wilson, Pacific Palisades, Calif., assignor to The Magnavox Company, Los Angeles, Calif., a corporation of Delaware Application July 30, 1956, Serial No. 600,975

18 Claims. (Cl. 271—27)

The present invention relates to apparatus for processing information storage cards of the type used, for example, in data processing systems. The invention is more particularly concerned with improved pneumatic apparatus for transporting such cards between one or more processing stations and one or more storage stacks.

Data processing systems are now being used in ever increasing numbers to assist in many types of business operations. It has been found that these systems are capable of performing many complex business routines with a high degree of speed and accuarcy. Most present day processing systems are constructed to utilize digital principles. These systems store information corresponding to the various items of the business operations to which they are applied in the form of a multiplicity of bits of digital information. Even though these bits of digital information may number in the millions, present day data processing systems are capable of selecting the information concerning any desired item and making the information readily available.

In most digital type data processing systems, the digital information is stored in a plurality of information cards. The information may be recorded or stored on the cards in any suitable manner. For example, each card may store the information in the form of a plurality of bits of data represented by holes or by the absence of holes. Alternately, the information may be represented by magnetic spots differentiated by a north or south polarization depending, for example, upon whether it is desired to indicate a "1" or a "0." In the larger data processing systems such as are used in conjunction with the more complex business operations, many hundreds of thousands of these cards may be utilized.

Pneumatic rotating drums have been used in one type of data processing system to withdraw the cards from one or more input stacks and to move the cards individually or in succession past a processing station. These drums have also served to transport the cards to one or more output or pick-up stacks after they have been processed at the processing station. A drum of this particular type is constructed so that a vacuum pressure is created in its periphery. This enables the cards to be retained firmly and securely on the peripheral surface of the drum as they are transported to and from the processing station.

The present invention is chiefly concerned with an improved construction for such a rotatable transporting drum. The invention is also concerned with various components associated with the drum and which co-operate with the drum to feed or remove the cards to or from its peripheral surface. The arrangement is such that the cards are so fed or removed with a proper orientation and without the danger of one or more of them becoming misplaced and damaged. One of the features of the invention is the provision of improved apparatus such as described above and which is constructed to assure such proper feed of the cards to and from the drum without the need for excessively close tolerances.

Another feature of the invention resides in an improved construction of the rotatable transporting drum so that it requires a minimum of parts and is relatively simple and inexpensive to construct, and so that an extremely high vacuum pressure may be created at its peripheral surface with a minimum of turbulence within the drum.

In the drawings:

Figure 1 is a top plan view illustrating in somewhat fragmentary form one embodiment of the improved transporting apparatus of the invention and which includes a rotatable drum and an associated input stack. This figure also illustrates certain mechanical and electrical features of an appropriate system for controlling the transfer of cards from the stack to the drum. These latter features are shown partly in block form from an electrical standpoint; and partly in plan, partly in section, and partly in perspective from a mechanical standpoint; one of the members being shown in solid lines in one position and in broken lines in a second position.

Figure 2 illustrates in further detail the construction of the drum shown in Figure 1 and the disposition of the drum relative to the cards in the input stack associated with the drum.

Figures 1, 3:
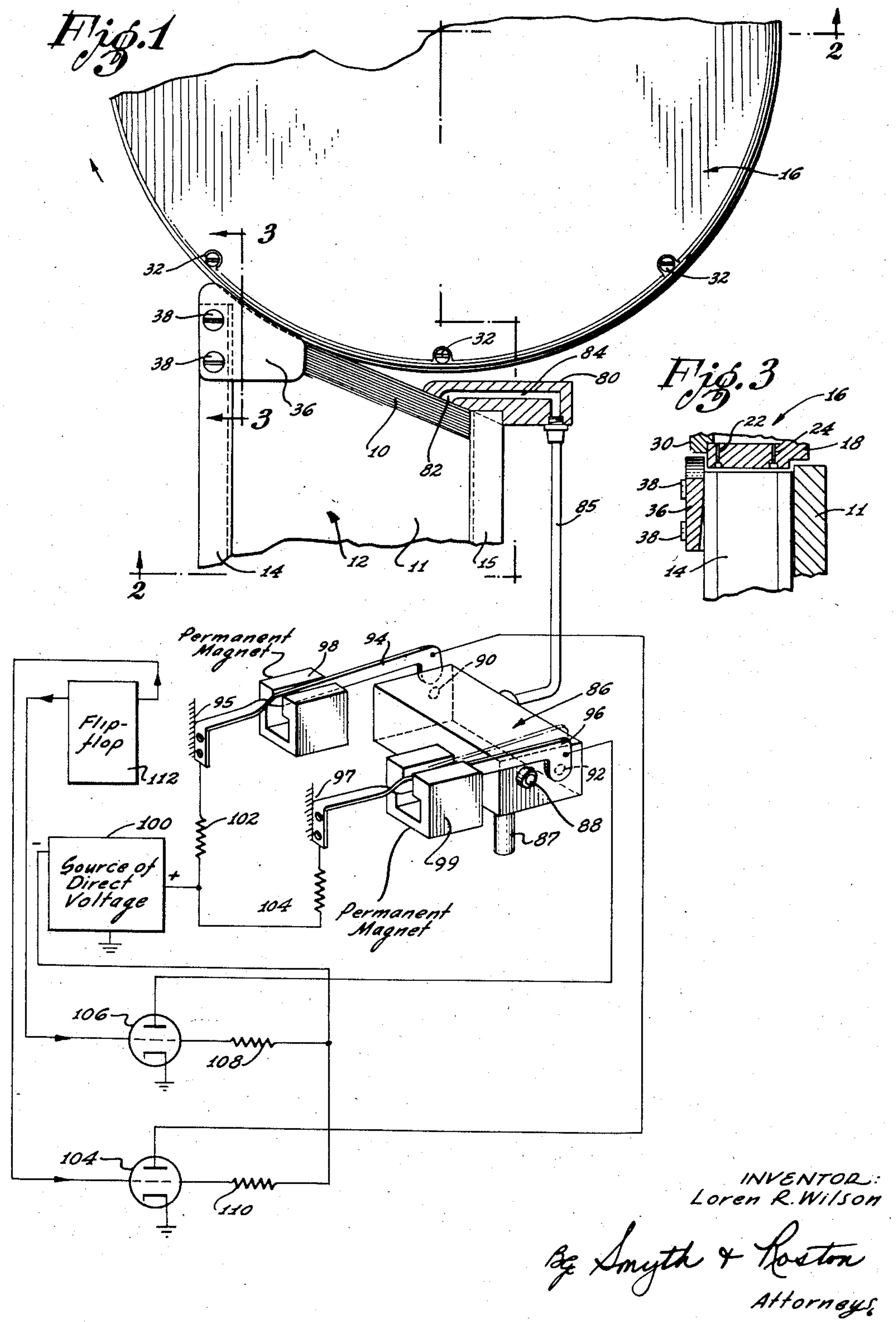
Figure 3 is a fragmentary sectional view, substantially on the line 3—3 of Figure 1.
Figure 2:
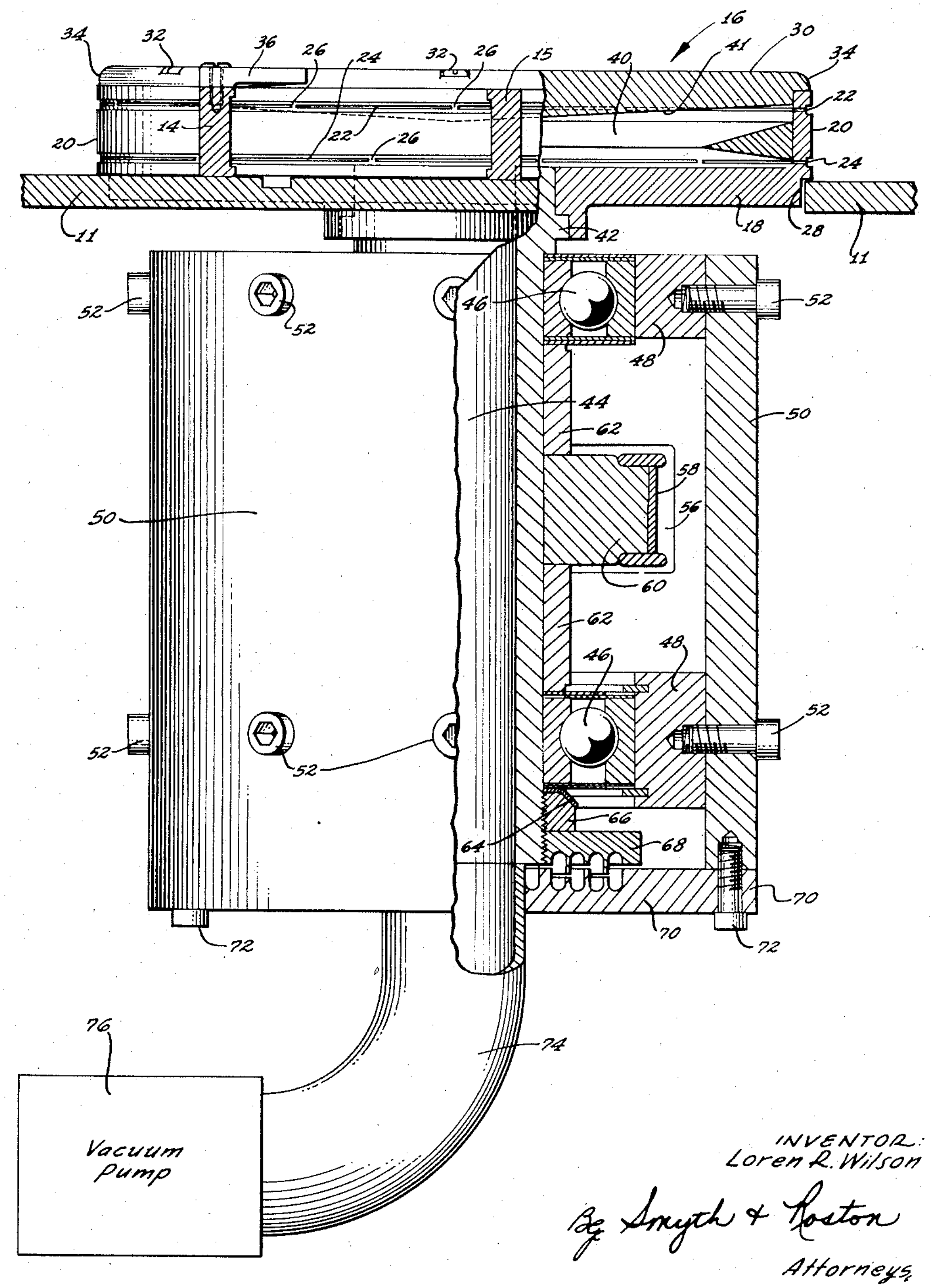
Figure 2 is a view partly in section and substantially on the line 2—2 of Figure 1.

In the embodiment of the invention shown in the drawings, a plurality of information storage cards 10 are disposed in an input stack 12. This input stack is formed by a pair of parallel walls 14 and 15, and these walls extend along the top surface 11 of an appropriate supporting table. The walls 14, 15, and the table top 11 are disposed so that the cards 10 may be held substantially vertical and in a stacked condition, as shown, and with the leading card in essentially tangential relation with the periphery of a rotatable drum indicated generally at 16. The cards extend between the walls 14, 15 and are held endwise with their lower edges resting on the table top 11. As will be described in detail subsequently, the drum 16 is positioned to be able to withdraw the cards from the stack 12 for movement on its periphery.

A plurality of bits of digital information may be stored on one or both sides of each card 10. Each bit of information by itself or in combination with other bits represents digital information pertaining to the items recorded in the system. The information may relate to numbers, alphabetical letters, combinations of letters or numbers (alpha-numeric coding), or to other pertinent matter. The bits of information may be disposed in a plurality of parallel rows extending along the length of each card and which define a corresponding series of transverse columns. In Figure 1, the rows of information would extend substantially in a horizontal direction along the individual cards with the columns extending vertically.

The drum 16 is made up of a lower section and an upper section. The lower section of the drum includes a disc-like bottom portion 18 and an annular side portion 20 integral with one another. A pair of axially spaced peripheral slots or orifices 22, 24 extend through the side portion 20. Each of the peripheral orifices is discontinuous in that it is interrupted at selected intervals about its periphery by ribs 26 integral with the side portion 20. The integral ribs 26 interrupting the orifice 22 are staggered with respect to the ribs interrupting the orifice 24. This staggering of the ribs is so that the orifices will not weaken the integral characteristics of the side portion 20 any more than is necessary. The staggering of the ribs 26 also insures that a vacuum pressure will be provided on the periphery of the drum 16 at every annular position around the periphery of the drum. Furthermore, since the slots 22 and 24 are formed in the side member 20, there can be no leakage of air through openings other than the slots to destroy the vacuum pressure at the slots.

The disc-like bottom portion 18 of the lower section is undercut as shown at 28 so that at least the end of this portion will have a reduced diameter with respect to the outer diameter of the annular side portion 20. This enables the table top 11 to extend beyond the outer limits of the side portion 20 so that the portion 20 overlaps the table top in the manner shown. Therefore, even without excessively close tolerances between the edge of the table top 11 and the rotating surface of the drum 16, the cards supported endwise on the table top in the stack 12 have no tendency to slip down between the table and the drum and become misplaced and damaged. The cards cannot slip down between the table 11 and the drum 16 even though the drum and the table are separated slightly in the vertical direction to obtain a rotation of the drum relative to the table.

The upper section of the drum 16 is in the form of a disc-like member 30 which engages the annular side member 20 of the lower section. The upper section 30 forms an enclosure with the lower section of the drum, with the upper section parallel to the disc-shaped bottom portion 18 of the lower section. The upper section 30 is held in place on the side portion 20 as by a series of screws 32. It should be noted that a vacuum pressure is created in the interior of the drum, in a manner to be described, and this pressure tends to retain the upper section 30 in place. The screws 32, therefore, need not be excessively large or strong, but merely serve to prevent rotation of the upper section when the apparatus is not in use. The upper section 30 is undercut as shown at 34 and has a smaller diameter than the outer diameter of the annular side portion 20 of the lower section.

When one of the cards 10 is fed from the stack 12 to the drum 16, it is held pneumatically on the outer peripheral surface of the annular side portion 20, as will be described. It is essential that the cards be fed to this peripheral surface in an accurately oriented position so that they may be properly processed in the system. The walls 14 and 15 of the stack 12 co-operate with the table top 11 to direct the cards to the peripheral surface of the portion 20.

To assure the proper orientation of the cards on this peripheral surface, a guide member 36 is mounted on the end of the wall 14 adjacent the drum 16 by suitable set screws 38 (Figure 3). The guide member 36 has a bottom surface which is bevelled downwardly in a direction toward the drum 16 as best seen in Figure 3. This bevelled surface acts to direct the cards on the periphery of the drum for proper positioning on the periphery.

A deflector ring 40 is supported within the interior of the drum 16 in press fit with the inner surface of the annular side portion 20. This deflector ring is tapered toward the center of the drum to prevent turbulence and provide a streamlined path for air that is drawn in through the orifices 22 and 24. Since a streamlined path for the air is created, an increased vacuum pressure is produced at the outer surface of the portion 20. Moreover, the undersurface of the upper section 30 is bulged to have a convex shape. This convex shape also aids in providing a smooth path for the air drawn in through the orifices 22 and 24 so as to increase the vacuum pressure at the periphery of the portion 20.

The portion 18 of the lower section of the drum 16 contains a central opening surrounded by an annular collar 41. The collar 41 surrounds a collar 42 provided at one end of a hollow shaft 44. The drum 16 is supported on a shoulder formed by the collar 42 and the end of the shaft 44 extends into the opening of the portion 18 in friction fit with that portion. Therefore, rotation of the hollow shaft 44 causes the drum 16 to rotate. Also, the shaft 44 communicates with the interior of the drum. Bearings 46 are provided at opposite ends of the shaft 44. The inner races of the bearings 46 are mounted on the shaft 44, and the outer races of the bearings are disposed against bushings 48 secured to a housing 50 by studs 52.

An arcuate opening 56 is provided in the housing 50 between the bearings 46. This opening enables a drive belt 58 to extend into the housing and round a pulley 60. The pulley 60 is affixed to the shaft 44 between the bearings 46 and is held against axial movement by sleeves 62. In this way, the shaft 44 and the drum 16 can be rotated by a suitable motor (not shown) coupled to the pulley 60 by the drive belt 58.

The bearings 46 and the sleeves 62 are held on the shaft 44 by a nut 66. The nut 66 is screwed on a threaded portion at the bottom of the shaft and a lock washer 64 is interposed between it and the lower bearing. A sealing disc 68 is also screwed on the threaded portion at the bottom of the shaft 44. The sealing disc 68 operates in conjunction with a bottom plate 70 to inhibit the movement of air between the interior of the housing 50 and the interior of the hollow shaft 44 when a difference of pressure exists between the housing and the shaft. The bottom plate 70 is secured to the housing 50 by studs 72, and it has a central circular opening. A hollow conduit 74 extends into the opening in friction fit with the plate 70. The conduit 74 is axially aligned with the hollow shaft 44 so that air may be exhausted from the hollow interiors of the shaft and the conduit by a vacuum pump 76. The vacuum pump may be of any suitable known construction and, for that reason, is shown merely in block form.

The vacuum pump 76 draws air in through the orifices 22 and 24 and through the interior of the drum 16 down the shaft 44 and through the conduit 74. This creates a vacuum pressure at the outer peripheral surface of the annular portion 20 of the lower section of the drum 16. The deflector ring 40 and the convex underside of the disc-like upper section 30 assures that the air will flow smoothly and with a minimum of turbulence. This assures a high and adequate pneumatic vacuum pressure around the outer surface of the annular side portion 20 to firmly retain the cards 10 on that surface.

The cards are retained within the input stack 12 by any suitable transfer mechanism. The particular mechanism illustrated in Figure 1 is similar to that disclosed and claimed in co-pending application Serial No. 552,506 filed December 12, 1955, in the name of Hans M. Stern and assigned to the assignee of the present application. The illustrated transfer mechanism includes a retainer 80 which extends across a portion of the mouth of the input stack 12 from the side of the stack facing the direction of rotation of the drum 16. The retainer contacts the trailing portion of the front surface of the leading card 10 in the stack, and the contacting surface of the retainer may be suitably roughened to exert a relatively large frictional force against this surface of the leading card. The retainer is also provided with one or more orifices 82 in its contacting surface. These orifices, in a manner to be described, exert a controllable vacuum pressure against the leading card to retain it in the input stack 12 against the pneumatic pressure exerted on this card by the peripheral surface of the drum 16.

Conduits such as the conduit 84 extend through the retainer 80, and these conduits communicate with a pipe 85 leading to a valve housing indicated generally at 86. The valve housing 86 has an outlet pipe 87 open to the atmosphere, and it also has a pipe line 88 which is connected to a suitable vacuum pump (not shown). The valve housing also has outlet orifices 90 and 92 at its opposite ends. The assembly is constructed so that when the orifice 92 is closed and the orifice 90 is open, the pipe line 85 is opened to the atmosphere. This means that no vacuum pressure exists at the orifices 82, so that cards are released from the stack 12 to the drum 16. On the other hand, when the orifice 90 is closed and the orifice 92 is open, the pipe line 85 is connected to a vacuum pump through the pipe line 88. As long as this latter condition persists, a vacuum pressure is exerted at the orifices 82 in the retainer 80 to retain the cards 10 within the stack.

The opening and closing of the orifices 90 and 92 is controlled by a pair of resilient electrically conductive metallic arms 94 and 96. These arms are fulcrumed at their respective ends 95, 97 to suitable stationary brackets, and each has a 90° twist intermediate its ends so that it may be flexed up and down about its fulcrumed end. The resilient arm 94 passes through a magnetic field that may be established in the air gap of a permanent magnet 98, or by any other suitable means. The arm 96 also passes through a magnetic field which may be established by a peramnent magnet 99 or by any other suitable known means. The arms 94 and 96 are arranged to be biased, in the absence of an electric current through them, to respective positions adjacent their associated orifices 90 and 92 to close and seal the orifices.

A suitable control for the system may include a source of direct voltage 100 having a positive terminal connected to resistors 102 and 104, these resistors being connected respectively to the ends 95 and 97 of the arms 94 and 96. The free end of the arm 94 is connected to the anode of a vacuum tube 104 which may be a usual triode. The free end of the arm 96, on the other hand, is connected to the anode of a vacuum tube 106 which also may be a triode. The control grids of the tubes 104 and 106 are connected respectively to resistors 108 and 110, and these resistors are connected to the negative terminal of the source 100 of direct voltage. The cathodes of the tubes 104 and 106 are connected to ground, as is the common terminal of the source 100.

The tubes 104 and 106 may be controlled by a flip-flop 112 which itself may be controlled in accordance with a suitable control system for determining when a card is to be removed from the input stack 12 for processing. The flip-flop is any usual bistable trigger circuit.

With the illustrated arrangement, and when the flip-flop 112 is in a "false" state to exhibit a relatively high voltage on its left output terminal, the tube 104 is conductive and the tube 106 is nonconductive. The conductivity of the tube 104 produces a current flow through the arm 94 and the resulting magnetic field surrounding this arm reacts with the field of the permanent magnet 98 to lift the arm against the resilient bias exerted by its fulcrumed end 95 so as to uncover the orifice 90. However, because the tube 106 is nonconductive, no current flows through the arm 96 and the orifice 92 is closed. This condition, as previously pointed out, removes the vacuum pressure from the orifice 82 so that the leading card 10 is released from the input stack 12 to the peripheral surface of the drum 16. This condition is usually allowed to persist only long enough to permit one card only to be released. Then the flip-flop 112 is triggered to its "true" state to exhibit a relatively low voltage on its left output terminal. This reverses the conductivity of the tubes 104 and 106, and the tube 104 is now nonconductive and the tube 106 is conductive. Now current flows through the arm 96 and the resulting magnetic field reacts with the magnetic field in the air gap of the permanent magnet 99 to raise the arm 96 to the position shown by the broken line so as to uncover the orifice 92. The arm 94, however, is biased to its position closing the orifice 90. This restores the vacuum pressure to the orifice 92 and retains the cards 10 within the stack 12. It can be seen, therefore, that it is merely necessary to trigger the flip-flop from its "true" to its "false" state whenever it is desired to release a card. Also as noted, the flip-flop should be maintained in its "false" state only long enough to permit on card to be transferred to the drum.

Due to the improved construction of the drum 16, and extremely high pneumatic retaining force is provided at the peripheral surface of the drum 16. Therefore, upon the release of a card by the retainer 80, it is quickly drawn to the drum and firmly retained on its peripheral surface. Moreover, the improved construction of the drum and its associated components permits this transfer to be executed without the danger of a card becoming misplaced and damaged, and this is accomplished without the need for excessively close tolerances. Also, the provision of the guide in co-operation with the other associated components assures that the cards will be directed to their proper aligned and oriented position on the periphery of the drum.

The invention provides, therefore, new and improved apparatus for the efficient transport of information cards between one or more storage positions and one or more processing stations.

Although this application has been disclosed and illustrated with reference to the particular applications, the principles involved are susceptible of numerous other applications which will be apparent to persons skilled in the art. The invention is, therefore, to be limited only as indicated by the scope of the appended claims.

What is claimed is:

1. Pneumatic transporting apparatus for information storage cards and the like including, a rotatable drum having an annular peripheral portion for supporting the cards and having at least one annular orifice extending through said peripheral portion, said drum further having at least one passageway therein communicating with said orifice, a hollow drive shaft for said drum communicating with said passageway, said drum having an axial end portion of reduced outer diameter with respect to the outer diameter of said peripheral portion, supporting means for the cards positioned adjacent said drum and adapted to support the cards in a stacked condition with the leading card in essentially tangential relation with said annular peripheral portion of said drum, said supporting means including a member having a surface on which the edges of the stacked cards rest, and said last-named member extending into contiguous relation with the periphery of said axial end portion of said drum and beyond the external limits of said annular peripheral portion of said drum.

2. Pneumatic transporting apparatus for information storage cards and the like including, a horizontal rotatable drum having an annular peripheral portion for supporting the cards and having at least one annular orifice extending through said annular portion, said drum further having at least one passageway therein communicating with said orifice, a vertical hollow drive shaft for said drum communicating with said passageway, said drum having a bottom portion of reduced outer diameter with respect to the outer diameter of said peripheral portion, supporting means for the cards positioned adjacent said drum and adapted to support the cards vertically in a stacked condition and with the leading card in essentially tangential relation with said annular peripheral portion of said drum, and said supporting means including a table having a horizontal top surface on which the lower edges of the stacked cards rest, the horizontal surface of said table extending beyond the external limits of said annular peripheral portion of said drum into contiguous relation with the periphery of said bottom portion of said drum.

3. The pneumatic transporting apparatus defined in claim 2 in which said rotatable drum also has an upper section of reduced diameter with respect to the diameter of said peripheral portion, and said supporting means includes a guide member extending beyond the external limits of said annular peripheral portion of said drum into contiguous relation with the periphery of said upper reduced section of said drum, said table and said guide cooperating to direct the cards to said annular peripheral portion of said drum and to orient the cards properly on said peripheral portion.

4. Pneumatic transporting apparatus for information storage cards and the like including a rotatable drum, said drum including a first section having a disc-shaped portion and further having an integral annular side portion, and said drum further including a second section of disc-like configuration adapted to engage said annular portion of said first section and define an enclosure with said first section, said annular portion of said first section being adapted to support the cards around its outer peripheral surface and having at least one annular orifice extending from the interior of said drum, a hollow drive shaft for said drum communicating with the interior thereof, and said disc-shaped portion of said first section of said drum being undercut so that at least an end portion thereof has a reduced outer diameter with respect to the outer diameter of said annular portion.

5. Pneumatic transporting apparatus defined in claim 4 in which said second section of said drum has an outer diameter which is less than the outer diameter of said annular portion of said first section.

6. Pneumatic transporting apparatus for information storage cards and the like including, a rotatable drum, said drum including a first section having a disc-shaped portion and further having an integral annular side portion, and said drum further including a second section of disc-like configuration adapted to engage said annular side portion of said first section and define an enclosure with said first section, said annular portion of said first section being adapted to support the cards around its outer peripheral surface and having a pair of axially spaced annular orifices extending therethrough from the interior of said drum, a hollow drive shaft for said drum communicating with the interior thereof, said disc-shaped portion of said first section of said drum being undercut so that at least an axial end portion thereof has a reduced outer diameter with respect to the outer diameter of said annular side portion, supporting means for the cards positioned adjacent said drum and adapted for supporting the cards in a stacked condition with the leading card in essentially tangential relation with the outer surface of said annular portion, said supporting means including a base member having a surface on which the edges of the stacked cards rest, and said last-named member extending beyond the external limits of said annular side portion of said first section of said drum into contiguous relation with said undercut end portion thereof.

7. Pneumatic transporting apparatus defined in claim 6 in which said second section of said drum has a reduced outer diameter as compared with the outer diameter of said annular side portion, and said card supporting means includes a chamfered guide number extending beyond the external limits of said annular number into contiguous relation with the periphery of said second section of said drum, said base member and said guide member co-operating to direct the cards to the outer peripheral surface of said annular side portion and to orient the cards properly on said outer peripheral surface.

8. Pneumatic transporting apparatus for information storage cards and the like including, a rotatable drum, said drum including a first section having a disc-shaped portion and further having an integral annular side portion, and said drum further including a second section of disc-like configuration adapted to engage said annular side portion by said first section in spaced parallel relation with said disc-shaped portion of said first section so as to define an enclosure with said first section, said annular side portion of said first section being adapted to support the cards around its outer peripheral surface and having a pair of axially spaced annular orifices extending therethrough from the interior of said drum, a hollow drive shaft for said drum communicating with the interior of said drum for withdrawing air from the same so as to create a vacuum pressure through said orifices at said outer peripheral surface of said annular side portion, and a deflector ring positioned in the interior of said drum adjacent the inner surface of said annular side portion of said first section between said orifices therein, said deflector ring being tapered in a direction toward the center of said drum to provide a minimum of turbulence of air flow from said orifices to said hollow drive shaft.

9. The combination defined in claim 8 in which said disc-like second section of said drum has an inner surface of convex configuration which co-operates with said deflector ring to provide said minimum turbulence of air flow from said orifices to said hollow drive shaft.

10. In apparatus for processing a plurality of information cards, a rotatable drum having a side member with a plurality of orifices extending annularly around the periphery of the drum, each of the orifices having an angular length less than the complete periphery of the drum and being separated from the adjacent orifices by portions forming an integral part of the side member and being disposed relative to the adjacent orifices to provide for the exertion of a vacuum force through the orifices at every annular position along the drum, and means for exerting a vacuum force through the orifices to hold the cards in fixed positioning on the drum as the drum rotates.

11. In apparatus for processing a plurality of information cards, a rotatable drum having a cylindrical side member with a plurality of orifices extending annularly around the periphery of the drum in at least a pair of loops disposed at spaced positions in the axial direction of the cylindrical side member, each of the orifices having an angular length less than a complete revolution of the drum and being separated from adjacent orifices by portions integral with the side member, the orifices in one of the loops being staggered with respect to the orifices in the other loop to produce a vacuum force at any angular position around the drum for maintaining the cards in fixed positioning on the drum as the drum rotates, and means associated with the drum for providing for a transfer of cards to the drum for fixed positioning on the drum as the drum rotates.

12. In a rotatable drum for processing a plurality of cards, hollow means having a plurality of orifices disposed in spaced relationship to one another about the periphery of the drum, a member disposed on the hollow means to provide a cover for the hollow means and having a convex shape along its bottom surface, a deflector ring disposed within the hollow means and having a configuration relative to the cover member and having a disposition relative to the orifices in the hollow means to provide for a smooth flow of air through the hollow means and the orifices in the hollow means, means for withdrawing air through the hollow means to produce a vacuum pressure at the periphery of the drum for a fixed positioning of the cards on the drum as the drum rotates, and means for providing for a transfer of the cards in the plurality to the drum for a fixed positioning of the cards on the drum as the drum rotates.

13. In apparatus for processing a plurality of information cards, a rotatable side member having a hollow configuration and having a plurality of orifices disposed in at least a pair of axially spaced loops in which the orifices in each loop are staggered relative to the orifices in the other loop to provide for a withdrawal of air through at least one orifice at every angular position around the periphery of the side member, a top member supported on the side member for rotary movement with the side member, a bottom member positioned below the side member for rotary movement with the side member, a ring disposed within the side member for rotary movement with the side member and having a configuration relative to the top and bottom members to produce passageways having increasing dimensions with progressive movements from the outer periphery of the side member and disposed to produce such passageways from the orifices for a smooth flow of air through the orifices, means for withdrawing air through the hollow side member and the passageways and the orifices for the production of a vacuum force at the periphery of the support member, and means for providing for a transfer of the information cards to the side member for a fixed positioning of the cards on the periphery of the side member as the side member rotates.

14. In apparatus for processing a plurality of information cards, rotatable annular means having a hollow interior, there being a plurality of orifices disposed at different positions around the periphery of the annular means, the orifices being disposed to provide at least one orifice at each angular position around the annular means for the withdrawal of air through the orifices at each annular position, an annular cover disposed on the hollow annular means for rotary movement with the hollow annular means and having at its bottom face a configuration tapering upwardly with progressive distances toward the periphery of the cover, an annular disc disposed below the hollow annular means for rotary movement with the hollow annular means, an annular deflector ring disposed within the hollow annular means for rotary movement with the hollow annular means and having an increasing thickness with progressive distances toward the external periphery of the ring, the ring being disposed relative to the cover and the disc and relative to the orifices in the annular means to direct a flow of air smoothly through the annular means and the orifices, means for withdrawing air through the orifices and the hollow annular means to produce a vacuum at the orifices for a fixed positioning of the information cards on the periphery of the hollow annular means, means for providing for a transfer of the cards to the hollow annular means for a fixed positioning of the cards on such annular means as such annular means rotate.

15. In the apparatus set forth in claim 13, the bottom disc having a lower portion of reduced width for extension through the table and having an upper portion of increased width for overhanging the table and the card-transfer means having a bevelled lower surface to facilitate the transfer of cards to the side member.

16. In apparatus for processing a plurality of information cards, an annular rotatable drum having a side member with a plurality of orifices extending in an annular direction through partial distances around the annular periphery of the drum and with each of the orifices being axially and annularly displaced relative to other orifices to obtain the disposition of at least one orifice at each annular position around the periphery of the drum, the rotatable drum also having a passageway communicating with the orifices and extending axially through the drum, means coupled to the passageway in the drum for withdrawing air through the passageway and the orifices to create a vacuum force on the periphery of the drum for holding cards in fixed position on the drum for movement with the drum, and means coupled to the drum for obtaining a rotary movement of the drum.

17. In apparatus for processing a plurality of information cards, a hollow rotatable drum having at least one orifice extending around the annular periphery of the drum for the withdrawal of air through the orifice and having a passageway extending through the drum from the orifice for the passage of the air withdrawn through the orifice, a member disposed in the drum in contiguous relationship to the orifice and shaped to provide a path having an increasing width between the orifice and the passageway for a smooth flow of air through the orifice and into the passageway, means coupled to the passageway for providing a withdrawal of air through the orifice and the passageway to produce a vacuum effect on the periphery of the drum for holding cards in fixed position on the drum, and means coupled to the drum for producing a rotary movement of the drum.

18. Apparatus as set forth in claim 17 in which an input stack is constructed to hold a plurality of cards in stacked relationship and is disposed in coupled relationship to the drum to obtain a sequential transfer of cards from the input stack to the drum and in which a retainer is disposed in coupled relationship to the cards in the input stack and is constructed to exert a vacuum force on the cards for retaining the cards in the input stack against the vacuum force exerted by the drum and in which means are coupled to the retainer for interrupting the vacuum force in the retainer at particular times to obtain a transfer of cards from the input stack to the drum.

References Cited in the file of this patent

UNITED STATES PATENTS

| | | |
|---|---|---|
| 1,105,352 | Kirsch | July 28, 1914 |
| 1,183,626 | Broadmeyer | May 16, 1916 |
| 2,057,279 | Shomaker | Oct. 13, 1936 |
| 2,752,154 | Nelson | June 26, 1956 |